(12) United States Patent
Behle et al.

(10) Patent No.: US 11,502,499 B2
(45) Date of Patent: Nov. 15, 2022

(54) COUPLING SLEEVE

(71) Applicant: NKT GmbH & Co. KG, Cologne (DE)

(72) Inventors: Mathias Behle, Cologne (DE); Uwe Amerpohl, Cologne (DE)

(73) Assignee: NKT GmbH & Co. KG, Cologne (DE)

( * ) Notice: Subject to any disclaimer, the term of this patent is extended or adjusted under 35 U.S.C. 154(b) by 0 days.

(21) Appl. No.: 17/258,255

(22) PCT Filed: Jul. 5, 2019

(86) PCT No.: PCT/EP2019/068160
§ 371 (c)(1),
(2) Date: Jan. 6, 2021

(87) PCT Pub. No.: WO2020/008058
PCT Pub. Date: Jan. 9, 2020

(65) Prior Publication Data
US 2021/0273437 A1    Sep. 2, 2021

(30) Foreign Application Priority Data

Jul. 6, 2018 (DE) ..................... 10 2018 116 416.5

(51) Int. Cl.
*H02G 15/107* (2006.01)
*H02G 15/184* (2006.01)

(52) U.S. Cl.
CPC ......... *H02G 15/107* (2013.01); *H02G 15/184* (2013.01)

(58) Field of Classification Search
CPC ........................... H02G 15/107; H02G 15/184
See application file for complete search history.

(56) References Cited

U.S. PATENT DOCUMENTS

| 4,654,241 A | * | 3/1987 | Vallauri | H02G 15/184 |
| | | | | 29/854 |
| 5,230,640 A | * | 7/1993 | Tardif | H01R 13/53 |
| | | | | 174/88 C |
| 5,502,279 A | * | 3/1996 | Mirebeau | H02G 15/103 |
| | | | | 174/73.1 |

(Continued)

FOREIGN PATENT DOCUMENTS

| CH | 710800 B1 | 8/2016 |
| CN | 103259240 A | 8/2013 |

(Continued)

OTHER PUBLICATIONS

German Search Report; Application No. 10 2018 116 416.5; dated Feb. 6, 2019; 7 pages.

(Continued)

*Primary Examiner* — Timothy J Thompson
*Assistant Examiner* — Rhadames Alonzo Miller
(74) *Attorney, Agent, or Firm* — Whitmyer IP Group LLC (57) ABSTRACT

A coupling sleeve for connecting cable ends of high-voltage DC cables by means of a connection body including control inserts for controlling the electric field, wherein the connection body is made of an elastomer, particularly a silicone elastomer. A cable system, particularly for high-voltage DC applications, including two cables and a coupling sleeve, as well as to a method for producing a coupling sleeve, and to a method for connecting two cable ends of two DC cables by means of a coupling sleeve.

17 Claims, 3 Drawing Sheets

(56) References Cited

U.S. PATENT DOCUMENTS

| | | | | |
|---|---|---|---|---|
| 2003/0134538 A1* | 7/2003 | Bolcar | H01B 3/28 | 439/607.41 |
| 2006/0272842 A1* | 12/2006 | Vallauri | H02G 1/145 | 174/73.1 |
| 2007/0037435 A1* | 2/2007 | Brus | H02G 15/184 | 439/404 |
| 2008/0045648 A1* | 2/2008 | Bayon | H02G 15/013 | 524/588 |
| 2009/0218135 A1* | 9/2009 | Vallauri | H02G 15/103 | 174/88 C |
| 2009/0266600 A1* | 10/2009 | Tornkvist | H01B 17/42 | 174/31 R |
| 2010/0101835 A1* | 4/2010 | Aue | H02G 15/18 | 174/21 R |
| 2010/0139974 A1* | 6/2010 | Christen | H02G 15/1806 | 174/84 R |
| 2010/0288527 A1* | 11/2010 | Lichy | H02G 15/068 | 174/73.1 |
| 2012/0273246 A1* | 11/2012 | Luzzi | H02G 15/1833 | 174/91 |
| 2013/0025911 A1* | 1/2013 | Borjesson | H01B 17/28 | 174/143 |
| 2013/0075124 A1* | 3/2013 | Li | H02G 15/064 | 174/19 |
| 2013/0078836 A1* | 3/2013 | Li | H01R 9/05 | 439/198 |
| 2013/0081851 A1* | 4/2013 | Li | H02G 15/064 | 174/73.1 |
| 2013/0333945 A1* | 12/2013 | Portas | H01R 4/10 | 174/84 R |
| 2014/0124263 A1* | 5/2014 | Ladie | H02G 15/24 | 174/88 R |
| 2014/0246220 A1* | 9/2014 | Allais | C08K 3/041 | 174/11 OR |
| 2014/0338953 A1* | 11/2014 | Seraj | H01R 4/70 | 174/138 F |
| 2015/0122546 A1* | 5/2015 | Saugrain | H02G 15/107 | 174/84 R |
| 2015/0334887 A1* | 11/2015 | Dinu | H02G 15/184 | 174/102 SC |
| 2016/0087352 A1* | 3/2016 | Jaroschek | H01R 13/447 | 439/801 |
| 2016/0164238 A1* | 6/2016 | Hobson | H02G 1/14 | 29/869 |
| 2017/0085075 A1* | 3/2017 | Yaworski | H02G 15/1833 | |
| 2017/0149151 A1* | 5/2017 | Allais | H01R 4/726 | |
| 2017/0244235 A1* | 8/2017 | Falth | H01B 7/28 | |
| 2017/0309376 A1* | 10/2017 | Iyer | H02G 15/184 | |
| 2018/0006439 A1* | 1/2018 | Meier | H02G 15/103 | |
| 2018/0062370 A1* | 3/2018 | Heidmann | H02G 15/046 | |
| 2018/0145495 A1* | 5/2018 | Iyer | H02G 15/1826 | |
| 2019/0237958 A1* | 8/2019 | Boffi | H02G 15/184 | |
| 2019/0295737 A1* | 9/2019 | Caimi | H01B 1/128 | |
| 2019/0341762 A1* | 11/2019 | Salame | H02G 15/18 | |
| 2020/0169075 A1* | 5/2020 | Greb | H02G 15/24 | |
| 2020/0203942 A1* | 6/2020 | Yasuda | H01B 9/027 | |

FOREIGN PATENT DOCUMENTS

| | | |
|---|---|---|
| DE | 19804159 A1 | 8/1999 |
| DE | 19856025 A1 | 6/2000 |
| DE | 102012203712 A1 | 9/2013 |
| EP | 429843 A1 | 6/1991 |
| EP | 2375423 A1 | 10/2011 |
| EP | 3034561 A1 | 6/2016 |
| WO | 2018234522 A1 | 12/2018 |

OTHER PUBLICATIONS

International Search Report and Written Opinion of the International Searching Authority; Application No. PCT/EP2019/068160; Completed: Aug. 13, 2019; dated Sep. 11, 2020; 13 Pages.

* cited by examiner

COUPLING SLEEVE

TECHNICAL FIELD

The invention relates to a coupling sleeve for connecting cable ends of high-voltage DC cables by means of a connection body comprising control inserts for controlling the electric field. The invention further relates to a cable system, in particular for high-voltage DC applications, a method for producing a coupling sleeve as well as a method for connecting two cable ends of two DC voltage cables.

BACKGROUND

Coupling sleeves in the field of electrical engineering have been known for many years from the state of the art. Such coupling sleeves in this case serve in particular to electrically and mechanically connect two cable ends. The coupling sleeves here constitute also insulation and protecting elements. The coupling sleeves can be fixedly connected to the cables and enclose the electrical cut-off point. For connecting the cable ends, the cores of the cables are correspondingly prepared in known coupling sleeves, inserted into the coupling sleeve and then fixed there, if need be.

In order to be able to correspondingly control the electric field within the coupling sleeve, coupling sleeves are known, for example, in which a high-voltage electrode is arranged inside the coupling sleeve. These high-voltage electrodes, designated, for example, as field or guard electrodes, have certainly proven their worth in the past, especially in AC voltage applications. In DC voltage sleeves, however, the particular requirements of DC technology need to be taken into account. Thus, transient processes such as in switching-on processes or in case of voltage pulses constitute challenges. The electrical properties of cable sleeves have proven to be insufficient in part for high-voltage DC applications. In addition, cables having a different diameter can only be connected by means of known sleeves in a limited manner.

SUMMARY

Against this background, there is the object of indicating a coupling sleeve, in particular for high-voltage DC applications, which has improved mechanical and electrical properties.

In a coupling sleeve of the initially mentioned kind, the object is solved in that the connection body is made of an elastomer, in particular of a silicone elastomer.

In this way, a coupling sleeve can be proposed by means of which the mechanical and electrical properties but also the assembly can be simplified. On the one hand, a connection body comprising control inserts for controlling the electric field, allows the potential distribution in the connection body to be predefined. By means of the control inserts, the electric field can in particular be adjusted over the entire progress in the radial direction of the connection body and at the boundary surfaces to the cable. The control inserts thus allow expensive high-voltage electrodes to be dispensed with. On the other hand, a flexible coupling sleeve can be realized due to providing a connection body of an elastomer, in particular of a silicone elastomer, which is formed to be elastically deformable. Hereby, in particular a simple and failure-unsusceptible structure and in particular a simple assembly may be the result.

Preferably, the control inserts are arranged to be layered and insulated from one another. The individual layers of the control inserts may preferably be arranged superimposed in the radial direction so that in cross-section a ring-shaped arrangement of the individual control inserts may be the result. The control inserts may further be composed of different materials. For example, control inserts having layers of a resistive material or a semiconducting or conducting material have proven to be advantageous. It is particularly preferred if the individual control inserts are separated from one another, in particular in the radial direction, by layers of an insulating material. The combination of control inserts and insulating layers then allows a targeted field control to be achieved.

A configuration which is preferred in this context, provides for the control inserts to be electrically conducting and to comprise in particular metal and/or conductive plastics. The conducting layers are separated from one another by insulating layers. The choice of the selective material allows the electrical properties of the individual control inserts to be adjusted as required.

According to a preferred configuration, it is provided for the control inserts to be introducible alternatingly with the elastomer by means of a printing process. In the process, it has proven to be particularly advantageous for the individual layers of control inserts and elastomer to be introduced into the coupling sleeve by means of a 3D printing process. In this way, the control inserts can be provided at defined distances from the inside to the outside. In doing so, different materials may preferably be used during the printing process for the control inserts and the elastomer layers. Silicones, silicone rubbers or the like have proven to be particularly suitable materials for the elastomer.

It is further advantageous for the control inserts to have a wall thickness of less than 500 μm, in particular of less than 200 μm. In this way, a large number of layers of control inserts can be introduced into the connection body.

A further configuration provides for at least five control inserts, particularly preferred at least eight control inserts, particularly preferred at least ten control inserts to be provided. By a high number of control inserts, the electric field can be influenced even better. In this way, the electrical properties of the connection body and the coupling sleeve can be further improved.

It is particularly preferred for at least one control insert, in particular a control insert located inside in the radial direction, to be at high-voltage potential and/or at least one control insert, in particular a control insert located outside in the radial direction, to be grounded. The electric field may thus be limited to the area between the outermost and the innermost control insert and the potential distribution of the electric field be controlled.

In a further development of the invention, it is proposed for the control inserts to be configured such that in transient processes, a capacitive field control and/or in stationary processes in a DC voltage application, a resistive field control can be generated. In transient processes, in particular the capacities between the individual control inserts can thereby be effective so that a field distribution in accordance with a capacitive voltage divider can be obtained. In the stationary DC voltage case, however, the resistances and/or the conductivities between the individual control inserts can be effective, so that in this case the control inserts can act like a resistive voltage divider. The individual conductive control inserts each can thereby adopt a potential in accordance with the relevant voltage divider.

It has proven to be particularly advantageous for the control inserts to be arranged radially around the cable ends. In this way, a uniform field distribution over the entire coupling sleeve can be achieved. The control inserts may extend preferably from the inside to the outside as individual radially arranged layers.

It is further preferred for the length of the individual control inserts to increase radially to the outside. The control inserts may thus form a kind of ring which can have a substantially conically shaped cross-sectional area. The control inserts may extend from one end of the connection body to the other end of the connection body. Particularly preferred, the control inserts may be extended from the inside to the outside in the direction to the boundary surface, and in particular in the direction of electrodes integrated into the connection body. In this way, conically shaped end areas of the control inserts can be realized. The control inserts, however, terminate inside the connection body. Thus, the potential distribution can be transmitted to and imprinted into the cable ends via the ends of the control inserts, in particular via the boundary surfaces. Furthermore, the electric field can in this way be guided over the entire area of the connection body according to the requirements placed upon the coupling sleeve.

Preferably, the electric field at the boundary surfaces of the connection body is adjustable, in particular via the distance of the control inserts from one another. The individual conductive control inserts each may assume a potential in accordance with the relevant voltage divider. The choice of the distance between the individual control inserts allows these voltage dividers to be adapted and thus the electric field at the boundary layers between the cable ends and the connection body to be adjusted. Thus, the field distribution can be refined and adjusted.

In this context, it is particularly preferred for the distance between the control inserts to be in the range from 0.5 to 3 mm, in particular in the range from 1 mm to 2 mm. Particularly preferred, the distance may further be in the range from 1.3 mm to 1.8 mm. These ranges have proven to be particularly advantageous for generating an electric field distribution having as few losses as possible. In this way, the electric field can be suitably conducted through the connection body.

An advantageous configuration provides for the connection body to be formed in one piece. Particularly preferred, the connection body has a sleeve main body in this case. On the external sides, preferably conductive electrodes may be integrated into the connection body and in particular into the sleeve main body.

The electrodes may preferably be configured as field control funnels and as circumferentially integrated electrode rings. In this way, the potential distribution can be adjusted and controlled additionally. The field control elements may thereby dominate in particular in transient processes.

Alternatively, the connection body may be formed to be multi-piece, in particular three-piece, with a sleeve main body and at least one adapter element. In this case, it has proven to be advantageous for the adapter element to be formed of a silicone elastomer having integrated field control elements. It is particularly preferred for the adapter element to comprise an insulating body and/or a field control electrode as field control element. The electrodes may preferably be formed as a field control element, in particular as a field control funnel, and may be formed as circumferentially integrated electrode rings. By means of the field control element, the potential distribution may be adjusted additionally at the boundary surfaces to the connection body.

The field control element may preferably be formed to be complementary to the sleeve main body of the connection body and/or to the stripped cable. The insulating body may be formed preferably from an elastomeric material such as silicone, EPDM or EPR. In this way, the field distribution may be adjusted reliably over the entire area.

The adapter element may be arranged preferably between the cable and the sleeve main body, and may in particular adapt to the shape of the sleeve main body and/or of the cable. It is particularly preferred for the sleeve main body and the adapter element to be made of the same material. However, configurations are also conceivable, in which the sleeve main body and the adapter element are made of different materials.

It is preferred for the connection body to be arranged in a housing. In this way, the connection body may be protected against environmental influences, such as dust, humidity and the like, whereby damages and/or ageing processes can be reduced. The housing may in particular be made of metal, plastics or the like. The housing may be formed in the shape of a cylinder tube. In this way, the connection body, and thus the connection point of the cable ends as well, can be wrapped with a mechanical protection satisfying the insulating properties of the cable sheath.

Particularly preferred, the connection body has a connection of current-carrying capacity for the electrical connection, in particular a connection free from field electrodes, for electrically connecting the conductors of the cable ends. The connection of current-carrying capacity may be formed in particular in some areas as a metallic tube, via which the current may be conducted. Due to the control inserts arranged within the connection body for controlling the electric field, expensive guard or field electrodes can be dispensed within the area of the connection of the two cable ends in dependence on the dimensioning on the control inserts. However, configurations are also conceivable, in which guard or field electrodes can be provided in addition to the control inserts.

According to a constructional configuration, it is proposed for the coupling sleeve to be formed as a push-on sleeve. In this respect, the coupling sleeve may be already completely prefabricated, whereby the fabrication effort at the installation site can be reduced significantly. The coupling sleeve may in this manner be pushed onto one of the cable ends at the installation site, the cable ends may be connected to one another, for example by press, screw or welded connections, and then the coupling sleeve may be pushed over the connection point. Expensive production processes such as the ones generated when a cast resin sleeve is produced, may thus be reduced.

In a cable system of the initially mentioned kind, the object is solved by two cables and a coupling sleeve. In this case, it has been proven as being advantageous for the coupling sleeve to have at least one of the features described above alone or in combination. The same advantages are obtained which have been described above in conjunction with the coupling sleeve.

An advantageous configuration of the cable system provides in this case for the cables to have different diameters. By providing the control inserts within the connection body of the coupling sleeve as well as configuring the coupling sleeve of an elastomeric material, even cables of different diameters may preferably be connected, since the differences can be compensated by the elastomeric material of the coupling sleeve.

It is further advantageous for the cables to have different electrical properties. In this way, even cables having different electrical properties may be connected to one another via the coupling sleeve, since the differences can be compensated via the materials and/or control inserts. From an electrical viewpoint, even cables having different material parameters and thus different electrical properties can be connected to one another, since the imprint of the potential distribution is strongly dominating, in particular in DC voltage applications. Due to the imprint of the potential distribution via the conductive control inserts within a connection body, it is therefore possible to suppress the different material parameters of the cable insulation.

For the solution of the initially mentioned object, a method for producing a coupling sleeve is furthermore proposed, wherein the elastomer of the connection body and the control inserts are alternatingly applied by means of a 3D printer, and a three-dimensional coupling sleeve is thus generated. In doing so, it has proven to be particularly advantageous for the coupling sleeve to have at least one of the features described above. Here, as well, the same advantages are obtained, which have already been described in conjunction with the coupling sleeve and/or the cable system, wherein individual features can be used alone or in combination.

By means of such a production method, coupling sleeves can be produced in a simple manner, which have high flexibility, on the one hand, and a good potential distribution, on the other. By means of a 3D printing method, the material can be applied layer by layer, and three-dimensional objects, in particular a coupling sleeve, be thus generated. In doing so, the layered structuring may be performed from one or more liquid or solid materials according to defined dimensions and shapes, preferably in a computer-controlled manner. Advantageously, physical or chemical hardening or melting processes can take place during structuring.

It has proven to be particularly advantageous for at least two different materials to be used. Preferably, a 3D printer can be used for the production, which is able to use a plurality of different materials during a printing process. In particular, multi-material 3D printing methods have proven to be advantageous. In this way, different materials having different electrical and/or mechanical properties can be employed. In such a manner, control inserts can be introduced in a defined way into the coupling sleeve, in particular at a predefined distance.

For the solution of the initially mentioned task, a method for connecting two cable ends of two DC voltage cables is furthermore proposed, in which the cable ends, in particular the cable insulations, are stripped and the cable ends connected to one another, and the coupling sleeve is pushed onto the connection point. In doing so, it has proven to be particularly advantageous for the coupling sleeve to have at least one of the features described above.

By providing a coupling sleeve according to the invention, cables can be connected to one another in a simple manner. The coupling sleeve may be prepared already in the factory and, in particular, the control inserts can be introduced into it. At the installation site, it is thus only required to insert the cable ends into the coupling sleeve and to connect them to one another mechanically. In this way, a simple assembly without being particularly failure-prone is obtained. Furthermore, in particular cables of different diameters and/or different electrical properties can also be connected to one another, since the coupling sleeve is able to adapt itself to the respective cables due to the elastomer.

In the method, the features and configurations described on the basis of the coupling sleeve and/or the cable system and/or the production method can also be used alone or in combination. The features and configurations described on the basis of the method and/or the cable system may also be used alone or in combination in a coupling sleeve and/or a cable system.

BRIEF DESCRIPTION OF THE DRAWINGS

Further particulars and advantages of the invention will be explained below in greater detail on the basis of exemplary embodiments illustrated in the drawings. Shown are in.

DETAILED DESCRIPTION

Figure 1:
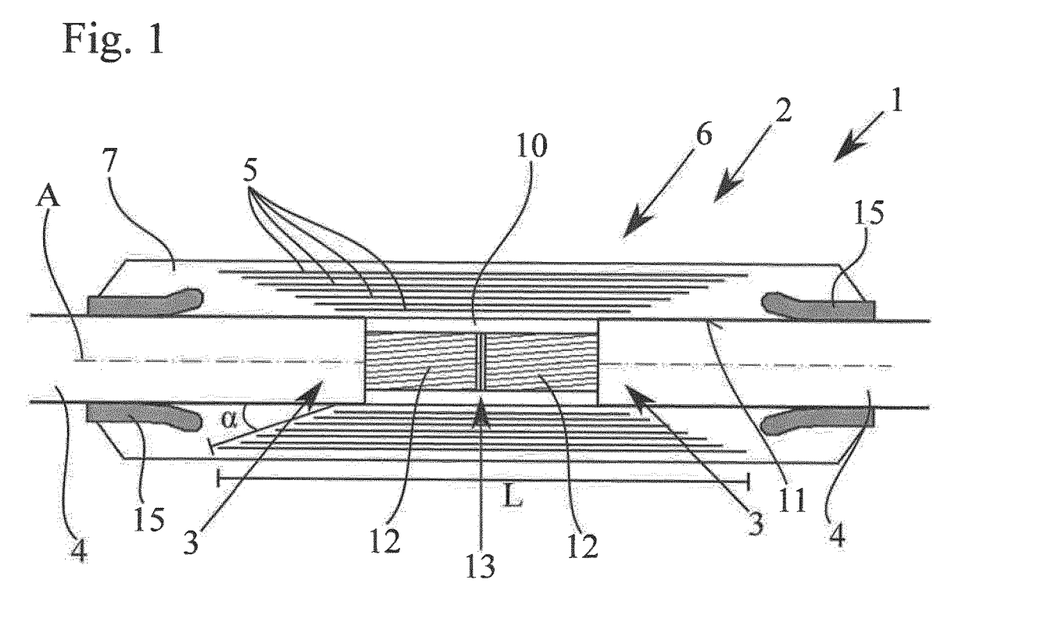
FIG. 1 a longitudinal section through a first exemplary embodiment of a one-piece coupling sleeve.

In FIG. 1, a first exemplary embodiment of a coupling sleeve 2 according to the invention is represented, by means of which two cable ends 3 of two high-voltage DC voltage cables 4 can be connected to one another.

Coupling sleeves 2 are used in many sectors of energy technology in the field of high voltage and maximum voltage for connecting high-voltage cables 4, for example, underground cables and the like. By means of the coupling sleeves 2, cable ends 3 both of DC voltage cables 4 and AC voltage cables can be connected to one another in a simple manner. At the same time, the coupling sleeves 2 protect the connection point 13 of the cable ends 3 of the cables 4 against external influences, such as humidity, dust or the intrusion of foreign bodies, since the connection point 13 is completely enclosed.

In case of known coupling sleeves 2, the cable ends 3 are first prepared correspondingly and then pushed into the coupling sleeve 2 and fixed there. For the field control, high-voltage electrodes 14, such as guard or field electrodes, their production, however, being very expensive, are in most cases provided, in particular in the sector of the alternating voltage. In addition, the connection bodies in corresponding coupling sleeves normally have a cast resin insulator, which complicates the production as well as the assembly. These coupling sleeves 2 have certainly worked quite satisfactorily but have proven to be rather disadvantageous both with respect to the assembly expenditure and also with respect to their electrical properties, in particular in DC voltage applications.

Basically, the field conditions in alternating and surge voltages are obtained as a capacitive displacement field which is determined by the materials. In case of DC voltage, an often completely different resistive flow field develops for which the conductivities are responsible. Mixed fields and transient loads result in this case in very complex field conditions which have to be taken into account in configuring a coupling sleeve 2. Insofar, it is normally not possible to use standard AC coupling sleeves also as DC coupling sleeves 2. The field distributions in cable systems 1 in case of DC voltage basically differ from the usually considered dielectric displacement fields in case of AC and surge voltage load. In case of a DC voltage being applied for a long time, a stationary flow field develops whose field distribution is no longer determined by the dielectric constants but is determined by the stationary conductivities of the insulating materials. Thereby, materials of higher conductivity are relieved, and high-impedance material of lower conductivity are heavily stressed. This is exacerbated by the fact that after switching on, modifying or reversing the polarity of a DC voltage, displacement fields occur seeking the stationary flow field in a transient process, wherein field migrations, that are difficult to distinguish, and load maxima can occur. A DC voltage cable system 1 needs to take into account all of these situations.

In the connection of two high-voltage DC voltage cables 4, the field control in the area of the coupling sleeve 2 represents in this respect an important issue. This is because the voltage occurring in the high-voltage DC voltage cable 4, and in particular the field intensities occurring in the high-voltage DC voltage cable 4, differ significantly depending on whether a use with AC voltage or DC voltage takes place. As a result of that, two AC voltage cables, that have a high-voltage electrode 14, for example, can be connected by known sleeves in a simple manner. In DC voltage applications, in particular at voltages above 250 kV, the field intensity, however, depends on transient and static processes within the high-voltage DC voltage cable 4, which cannot be handled by known sleeves.

These disadvantages can be resolved by the coupling sleeve 2 according to the invention. As shown in FIG. 1, the coupling sleeve 2 has a connection body 6 comprising control inserts 5 for controlling the electric field. In this way, a coupling sleeve 2 can be proposed by means of which not only the electrical properties but also the assembly can be simplified, in particular in DC voltage applications. Hereby, coupling sleeves 2 may also be employed in DC voltage applications, in particular in the field of high voltage and maximum voltage. A connection body 6 having control inserts 5 allows the potential distribution in the connection body 6 to be predefined.

The coupling sleeve 2 is substantially structured in a layer-like manner. The coupling sleeve 2 furthermore has a rotationally symmetric structure. Inside the coupling sleeve 2 and in the center of the connection body 6, a connection 10 of current-carrying capacity is arranged, which electrically connects the conductors 12 of the cable ends 3 to one another, so that a current and/or voltage transmission can take place. The connection 10 of current-carrying capacity is formed as a metallic tube in the present exemplary embodiment, via which the current can be conducted through the coupling sleeve 2.

The connection 10 of current-carrying capacity is in this case configured to be free from a field electrode according to the exemplary embodiment illustrated in FIG. 1, what means that it is not necessary to provide expensive high-voltage electrodes 14, such as guard or field electrodes for controlling the electric field. It may rather be a simple electrical connection, for example, in the form of a metal tube.

Figure 2:
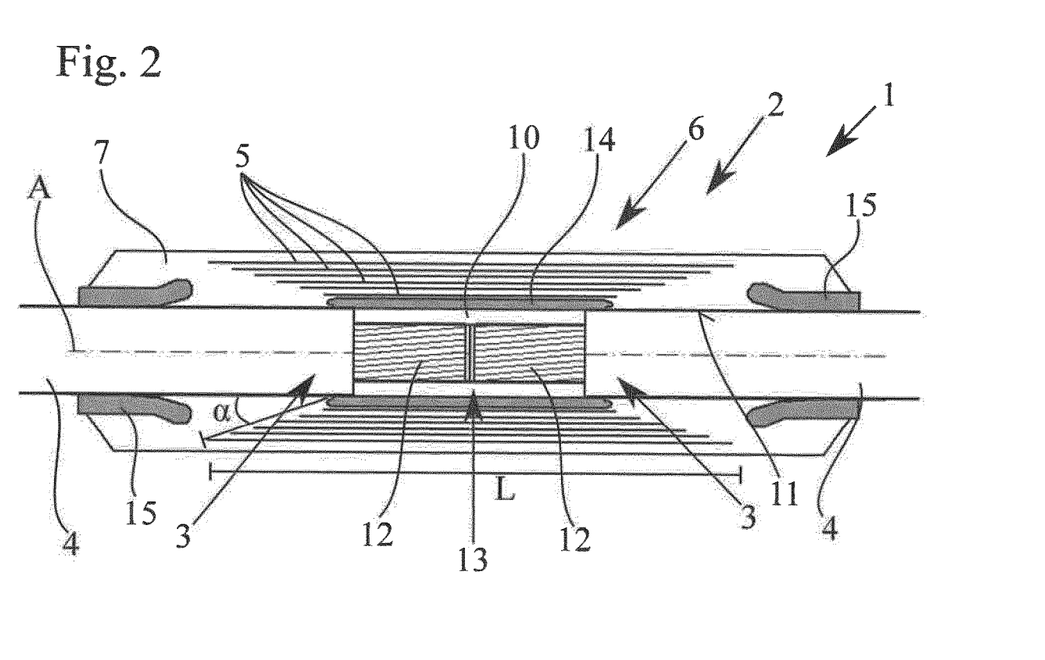
FIG. 2 a longitudinal section through a second exemplary embodiment of a one-piece coupling sleeve with a high-voltage electrode.

FIG. 2 shows an alternative configuration. The coupling sleeve 2 illustrated in FIG. 2 is substantially identical to the coupling sleeve 2 illustrated in FIG. 1. This second exemplary embodiment, however, differs form the first exemplary embodiment in that a high-voltage electrode 14 is provided in the area of the connection 10 of current-carrying capacity. In this way, the field control can be improved additionally.

Further outside in the radial direction, following the connection 10 of current-carrying capacity with or without a high-voltage electrode 14, are the control inserts 5 for controlling the electric field. The choice of the control inserts 5 and in particular the choice of the materials and distances thereof, allow the potential distribution to be adjusted within the connection body 6.

The control inserts 5 are configured to be rotationally symmetrical and are in particular arranged to be layered and insulated from one another within the connection body 6. The individual layers of the control inserts 5 extend in this case in the radial direction, so that a ring-shaped arrangement is obtained in cross section. The control inserts 5 are in particular arranged radially around the cable ends 3. The control inserts 5 may be made of different materials and may have different electrical properties. Thus, it has proven to be advantageous for different control inserts 5 having conductive, semiconductive or resistive properties to be used. The control inserts 5, for example, may be manufactured from metal and/or conductive plastics, and may have a wall thickness of less than 500 µm, in particular of less than 200 µm.

The individual control inserts 5 are separated from one another in the radial direction by layers of an insulating material. The combination of control inserts 5 and insulating layers allows a targeted field control to be achieved. It is in particular possible to dispense with additional materials having field-controlling properties such as non-linear, resistive field-controlling materials. Hereby, the costs can be reduced and disadvantages avoided which may occur due to the use of such materials when DC voltage systems are tested using alternating voltage.

The length L of the individual control inserts 5 may increase radially to the outside, whereby an angle $\alpha$ is formed between the boundary surface 11 of the cable end 3 and the control inserts 5. By the choice of the length L of the control inserts 5 and/or of the angle $\alpha$, the field distribution properties may be adjusted additionally and adapted to the respective case of application. In this case, lengths L in the range of 10 cm to 50 cm, however, particularly preferred in the range of 20 cm to 30 cm have proven to be preferred. As an angle $\alpha$ between the longitudinal axis A of the coupling sleeve 2 and the boundary surface 11 of the inner cone, angles $\alpha$ of less than 60°, preferably of less than 45°, and particularly preferred of substantially 25°, have proven to be preferred in this case. The control inserts 5 thus form a conical contour at their ends, whereby additional positive electrical properties can be achieved. The individual control inserts 5 thus result as a whole in a conical shape, with the cross section of the torus being configured in a pyramid-shape or cone-shape. In total, a plurality of control inserts 5 may be provided. In this case, however, it has proven to be preferred for at least five control inserts 5, preferably at least eight control inserts 5, and particularly preferred at least ten control inserts 5 to be provided. In this way, the potential distribution defined by the control inserts 5 and, if provided, the high-voltage electrode 14, can be transmitted via the polymeric, in particular elastomeric material of the sleeve main body 7 to the boundary layer 11 between the sleeve main body 7 and the insulation of the cables 4, whereby the field distribution can be specified and adjusted there as well.

The innermost control insert 5 of the control inserts 5 is at high-voltage potential, and the control insert 5 located radially farthest outside can be grounded. Due to that, the electric field is then limited to the area between said outermost and the innermost control insert 5. By means of the control inserts 5 and the insulating layers, a capacitive field control in transient processes and/or a resistive field control in DC voltage applications can thus be generated. In transient processes, the capacities between the individual control inserts 5 are effective, and the result is a field distribution according to a capacitive voltage divider. In the stationary DC voltage case, however, the resistances and/or the conductivities prevail so that in this case the control inserts 5 are effective like a resistive voltage divider. Since the individual control inserts 5 each assume a potential according to the relevant voltage dividers, the electric field can be adjusted in particular via the distance of the conductive control inserts 5. This distance between the control inserts 5 may in this case preferably be in the range from 0.5 mm to 3 mm, particularly preferred in the range from 1 mm to 2 mm, and particularly preferred in the range from 1.2 mm to 1.8 mm.

The control inserts 5 are embedded in the connection body 6. According to the first two exemplary embodiments according to FIG. 1 and FIG. 2, the connection body 6 is formed in one piece with the sleeve main body 7. The connection body 6, and in particular the sleeve main body 7 have a cylindrical structure as a whole. The connection body 6, and in particular the sleeve main body 7 are made of an elastomer, in particular a silicone elastomer. As compared to known solutions, the assembly and in particular the assembly time, may be improved in this way, since the coupling sleeve 2 can be flexibly pushed onto the cable ends 3 of the high-voltage DC voltage cables 4. For example, polymeric materials, HTV, RTV and/or LSR silicones have in this case proven to be advantageous as materials. By providing such a sleeve main body 7, a high-voltage resistant sheathing of the connection area of the conductor ends 12 at a simultaneous connection to the cable insulations can be achieved.

In addition, the sleeve main body 7 has at both ends field control elements 15 formed as conductive electrodes. These can be formed in particular as integrated electrodes and be effective during the transient processes. The field control elements 15 may be formed in particular as field control funnels, for example, in the form of electrode rings.

The connection body 6 as a whole is configured to be cylindrical and likewise designed in a rotationally symmetrical manner. The connection body 6 may be arranged within a housing 9 which totally encloses the connection body 6 and thus protects it against environmental influences. Furthermore, the connection body 6 may be sheathed by further elements such as, for example, ribbons, shrink tubes and the like. The housing 9 preferably may be formed as a two-part cylinder tube so that the two partial elements of the housing 9 may be pushed onto the connection body 6 from both sides of it.

Figure 3:
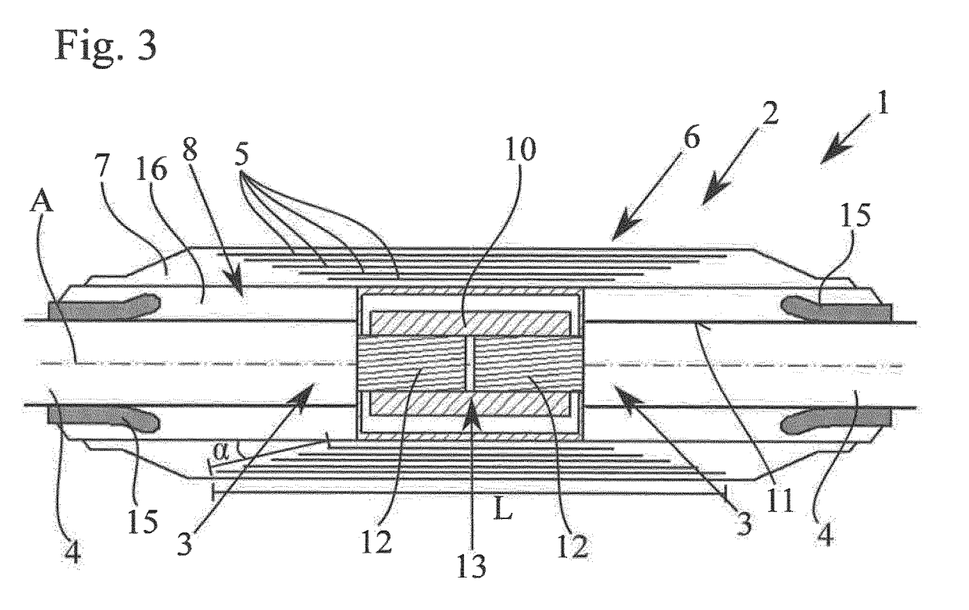
FIG. 3 a longitudinal section through a third exemplary embodiment of a three-piece coupling sleeve.
Figure 4:
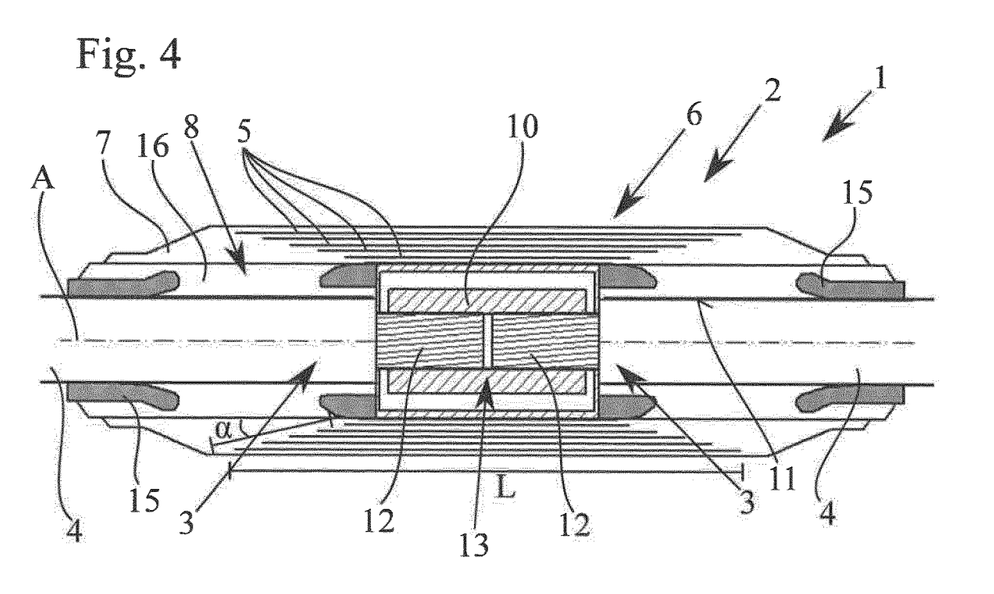
FIG. 4 a longitudinal section through a fourth exemplary embodiment of a three-piece coupling sleeve with a high-voltage electrode.

FIGS. 3 and 4 show further exemplary embodiments of a coupling sleeve 2 according to the invention. In contrast to the coupling sleeves illustrated in FIGS. 1 and 2, the connection body 6 in these ones is formed to be multi-piece, in particular three-piece, with a sleeve main body 7 and at least one adapter element 8. With regard to the other properties, these are, however, identical to the coupling sleeves 2 according to the first two exemplary embodiments.

The exemplary embodiments of the coupling sleeves 2 illustrated in FIGS. 3 and 4 are three-part coupling sleeves 2, in which adapter elements 8 are provided on both sides of the connection body 6. The adapter elements 8 can be arranged preferably between the sleeve main body 7 and the cable ends 3. In this case, the adapter elements 8 have the field control elements 15 which in turn are embedded in an insulating body 16. Preferably, the adapter elements 8 and in particular the insulating body 16 of the adapter elements 8 may be made of the same material as the sleeve body 7, and, for example, be made of an elastomeric material such as silicone, EPDM or EPR so that these have insulating properties. By means of such adapter elements 8, higher flexibility can be achieved in addition, which also allows cables 4 of different diameters and/or electrical and/or mechanical properties to be connected, for example. Via the field control element 15, the electric field distribution in the area of the boundary surfaces 11 may be influenced in addition.

Figure 5:
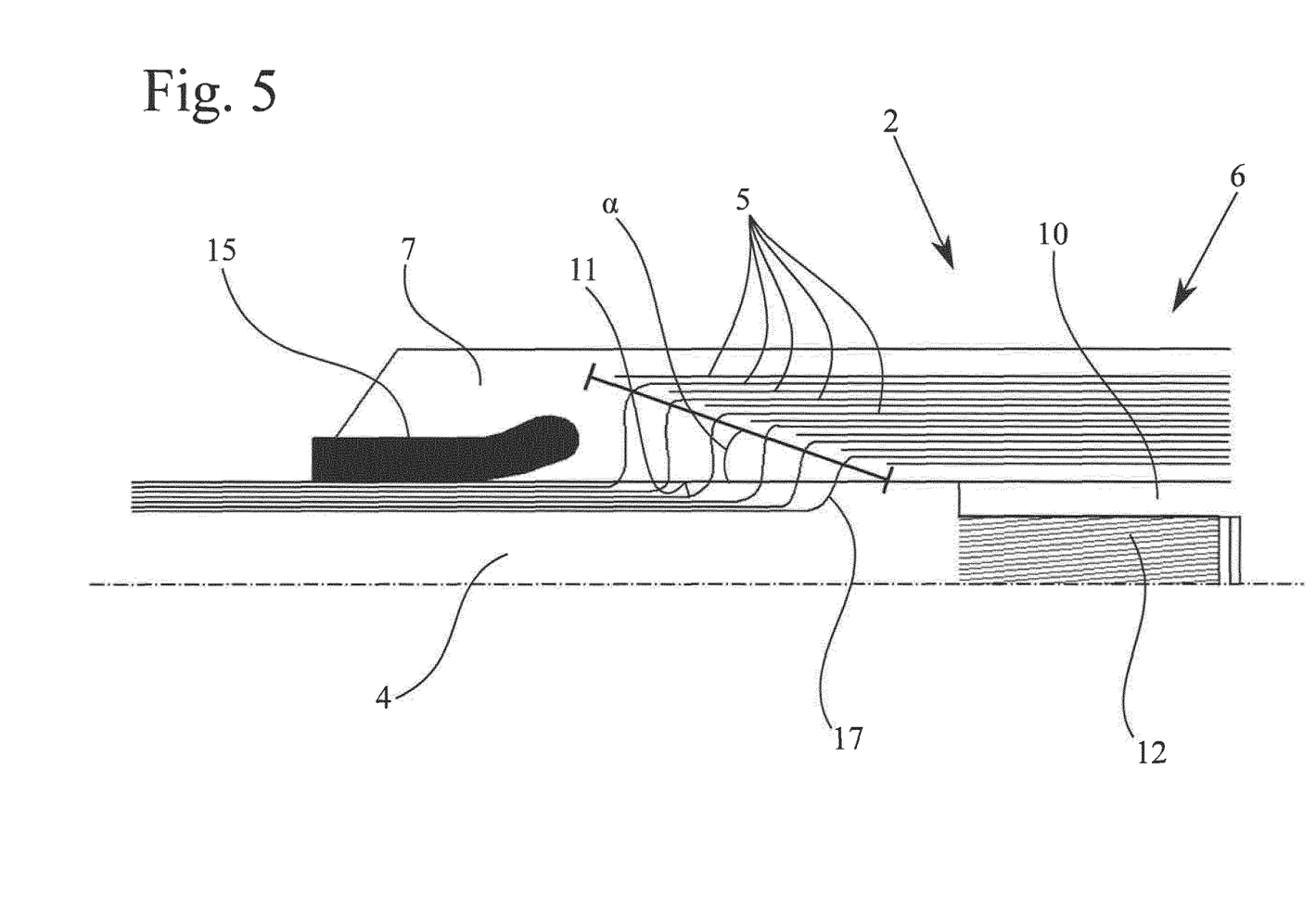
FIG. 5 a schematic representation of the potential curve.

By means of a coupling sleeve 2 according to the invention, the potential distribution can be adjusted over the complete sleeve 2, and in particular the potential distribution over the sleeve main body 7 and/or the adapter elements 8 be imprinted into the boundary layer 11 between the connection body 6 and the cable 4. FIG. 5 shows such a progress of the potential distribution at the boundary layers 11 in an exemplary manner.

As can be recognized there, the electric field is conducted via the control inserts 5 of the coupling sleeve 2 within the connection body 6. At the boundary surface 11, the electric field then enters the cable insulation of the cable 4. Insofar, the potential distribution is transmitted via the ends of the control inserts 5 at the inner cones to the cable 4 and imprinted there. Due to the conical configuration of the control inserts 5 in the proximity of the boundary surface 11, the field distribution can be adjusted and controlled in the area of transition between two solid materials. Insofar, a control of the field intensity can be performed inside the sleeve 2. In this case, the potential distribution depends on the distance of the conductive control inserts 5. During transient processes, the grounding electrodes 15 in the sleeve main body 7 and/or the adapter elements 8 are moreover effective. Due to imprinting the potential distribution via the conductive control inserts 5 within a connection body 6, it is therefore possible to suppress the different material parameters of the cable insulation.

The coupling sleeve 2 represents a part of a cable system 1, in particular of a cable system 1 for high-voltage DC voltage applications with two cables 4 and a coupling sleeve 2. By means of such a cable system 1 and in particular such a coupling sleeve 2, cable ends 3 of different electrical properties and/or different diameters can be connected. Due to different material parameters, this is not possible in case of normal sleeves. This is, however, possible with the coupling sleeve 2 according to the invention due to imprinting the potential distribution via the conductive control inserts 5 within the connection body 6. This is because the different material parameters are less decisive in this case. Rather, the imprint of the potential distribution is dominating.

The coupling sleeve 2 is preferably formed as a push-on sleeve so that it can be pushed over the connection point 13 of the conductors 12 after a connection process. In a method for connecting two cable ends 3 of two DC voltage cables 4, first the cable ends 3, in particular the cable insulations can be stripped and the cable ends 3 be connected to one another, and subsequently the coupling sleeve 2 can be pushed onto the connection point 13. Cables 4 can thus be connected to one another in a simple manner. The coupling sleeve 2 can thus be prepared already in the factory, and in particular the control inserts 5 can be embedded in it. At the installation site, it is therefore merely required for the cable ends 3 to be inserted into the coupling sleeve 2, and to mechanically connect them to one another. In this way, a simple assembly is obtained without being particularly failure-prone. Furthermore, in particular cables 4 of different diameters and/or different electrical properties may also be connected to one another, since the coupling sleeve 2 is able to adapt itself to the respective cables 4 due to the elastomer.

For producing a coupling sleeve 2, the elastomer of the connection body 6 and the control inserts 5 are alternatingly applied by means of a 3D printer, and a three-dimensional coupling sleeve 2 is thus generated. In this case, the control inserts 5 can be introduced alternatingly with the elastomer by means of the printing method. Correspondingly produced coupling sleeves 2 have high flexibility, on the one hand, and a good potential distribution, on the other. By means of a 3D printing method, the material can be applied layer by layer, and three-dimensional objects, in particular a coupling sleeve 2, be thus generated. In doing so, the layered structuring may be performed from one or more liquid or solid materials according to defined dimensions and shapes, preferably in a computer-controlled manner. Advantageously, physical or chemical hardening or melting processes can take place during structuring.

It has proven to be particularly advantageous for at least two different materials to be used. Preferably, a 3D printer can be used for the production, which is able to use a plurality of different materials during a printing process. In particular, multi-material 3D printing methods have proven to be advantageous. In this way, different materials having different electrical and/or mechanical properties can be employed. In such a manner, control inserts 5 can be introduced into the coupling sleeve 2 in a defined manner, in particular at a predefined distance.

The range of application of the coupling sleeve 2 according to the invention as well as of the cable system 1 preferably is at voltages which are higher than 150 kV. Particularly preferred, however, are ranges of application of more than 300 kV, in particular of more than 500 kV. Applications in the range of medium voltage, however, are also possible. The coupling sleeve 2 according to the invention is in this case particularly suitable for high-voltage DC voltage applications. An adaptation to higher voltages can in this case in particular be achieved by adapting the dimensions of the connection body 6 as well as of the control inserts 5. In addition, the coupling sleeve 2 is also suitable for being employed in the field of underground cables, where other requirements apply than it is the case, for example, in feedthroughs or cable terminations.

By means of a coupling sleeve 2 according to the invention with a connection body 6 comprising control inserts 5, as well as a sleeve main body 7 made of an elastomer, even cables 4 of different diameters and/or electrical and/or mechanical properties can be connected to one another. Due to an elastomeric connection body, in particular of a silicone elastomer, the potential distribution can be imprinted in a simple manner at the boundary surface to the cable 4. The results are a simple assembly as well as improved electrical properties due to the configuration of the control inserts 5.

The invention claimed is:

1. A coupling sleeve for connecting cable ends of high-voltage DC voltage cables by means of a connection body comprising at least five control inserts for controlling the electric field,
   wherein the connection body is made of an elastomer,
   wherein the control inserts are arranged to be layered and insulated from one another,
   wherein the control inserts are electrically conducting and neither semiconducting nor resistive, and
   wherein the control inserts are configured such that in transient processes, a capacitive field control can be generated, and wherein in transient processes, the capacities between the individual control inserts are effective, and the result is a field distribution according to a capacitive voltage divider.

2. The coupling sleeve according to claim 1, wherein the control inserts comprise any of: metal or conductive plastics.

3. The coupling sleeve according to claim 1, wherein the control inserts can be introduced alternatingly with the elastomer by means of a printing method.

4. The coupling sleeve according claim 1, wherein any of:
   at least one control insert is at high-voltage potential, or
   at least one control insert is grounded.

5. The coupling sleeve according to claim 1, wherein the control inserts are configured such that:
   in stationary processes, a resistive field control can be generated.

6. The coupling sleeve according to claim 1, wherein the control inserts are arranged radially around the cable ends.

7. The coupling sleeve according claim 1, wherein the length of the individual control inserts increases radially to the outside.

8. The coupling sleeve according to claim 1, wherein by means of the control inserts the electric field is adjustable at the boundary surfaces of the connection body.

9. The coupling sleeve according to claim 1, wherein the connection body is formed in one piece.

10. The coupling sleeve according to claim 1, wherein the connection body is formed to be multi-piece with a sleeve main body and at least one adapter element.

11. The coupling sleeve according to claim 1, wherein the connection body has a connection of current-carrying capacity for electrically connecting the conductors of the cable ends.

12. The coupling sleeve according to claim 1, wherein the coupling sleeve is formed as a push-on sleeve.

13. A cable system comprising two high-voltage DC cables and a coupling sleeve for connecting cable ends of the high-voltage DC voltage cables, the coupling sleeve having a connection body comprising at least five control inserts for controlling the electric field,
   wherein the connection body is made of an elastomer,
   wherein the control inserts are arranged to be layered and insulated from one another,
   wherein the control inserts are electrically conducting and neither semiconducting nor resistive, and
   wherein the control inserts are configured such that in transient processes, a capacitive field control can be generated, and wherein in transient processes, the capacities between the individual control inserts are effective, and the result is a field distribution according to a capacitive voltage divider.

14. The cable system according to claim 13, wherein the cables have any of:
   different diameters, or
   different electrical properties.

15. A method for producing a coupling sleeve for connecting cable ends of high-voltage DC voltage cables by means of a connection body comprising at least five control inserts for controlling the electric field,
   wherein the connection body is made of an elastomer,
   wherein the control inserts are arranged to be layered and insulated from one another,
   wherein the control inserts are electrically conducting and neither semiconducting nor resistive,
   wherein the control inserts are configured such that in transient processes, a capacitive field control can be generated, and wherein in transient processes, the capacities between the individual control inserts are effective, and the result is a field distribution according to a capacitive voltage divider, and
wherein the method includes that the elastomer of the connection body and the control inserts are applied alternatingly by means of a 3D printer, and a three-dimensional coupling sleeve is thus generated.

16. The method according to claim 15, wherein at least two different materials are used.

17. A method for connecting two cable ends of two DC voltage cables by means of a coupling sleeve for connecting cable ends of high-voltage DC voltage cables by means of a connection body comprising at least five control inserts for controlling the electric field, wherein the connection body is made of an elastomer, wherein the control inserts are arranged to be layered and insulated from one another, wherein the control inserts are electrically conducting and neither semiconducting nor resistive, wherein the control inserts are configured such that in transient processes, a capacitive field control can be generated, and wherein in transient processes, the capacities between the individual control inserts are effective, and the result is a field distribution according to a capacitive voltage divider, and wherein the method includes that the elastomer of the connection body and the control inserts are applied alternatingly by means of a 3D printer, and a three-dimensional coupling sleeve is thus generated.

\* \* \* \* \*